United States Patent
Kemmler

(10) Patent No.: US 8,140,470 B2
(45) Date of Patent: Mar. 20, 2012

(54) UNIFIED AND EXTENSIBLE IMPLEMENTATION OF A CHANGE STATE ID FOR UPDATE SERVICES BASED ON A HASH CALCULATION

(75) Inventor: Andreas Kemmler, Boennigheim (DE)

(73) Assignee: SAP AG, Walldorf (DE)

( * ) Notice: Subject to any disclaimer, the term of this patent is extended or adjusted under 35 U.S.C. 154(b) by 354 days.

(21) Appl. No.: 11/831,715

(22) Filed: Jul. 31, 2007

(65) Prior Publication Data

US 2009/0037453 A1   Feb. 5, 2009

(51) Int. Cl.
*G06F 7/00* (2006.01)
(52) U.S. Cl. .................... 707/602; 707/609; 709/201
(58) Field of Classification Search ............ 707/2, 609, 707/602
See application file for complete search history.

(56) References Cited

U.S. PATENT DOCUMENTS

| | | | |
|---|---|---|---|
| 2003/0009694 A1* | 1/2003 | Wenocur et al. | 713/201 |
| 2004/0133445 A1* | 7/2004 | Rajan et al. | 705/1 |
| 2004/0167878 A1* | 8/2004 | Doddington | 707/3 |
| 2004/0236945 A1* | 11/2004 | Risan et al. | 713/165 |
| 2005/0010606 A1* | 1/2005 | Kaiser et al. | 707/200 |
| 2005/0021354 A1* | 1/2005 | Brendle et al. | 705/1 |
| 2005/0028006 A1* | 2/2005 | Leser et al. | 713/200 |

* cited by examiner

*Primary Examiner* — Fazlul Quader
(74) *Attorney, Agent, or Firm* — Kenyon & Kenyon LLP

(57) ABSTRACT

In a method and system for updating data in a distributed system, a server receives a request to read data stored in the server. A data structure is populated with the requested data, and a first unique identifier is generated by applying a hash function to the data stored in the data structure. The data and the first unique identifier are transmitted to the requesting client. From the client system, the server receives the first unique identifier and changes to the requested data performed on the client system through a web service application. The changes include an extension to the requested application data to include customer-specific data. Following receipt of the changed data and the first unique identifier, a second data structure is populated with the requested data. A second unique identifier is generated by applying a hash function to the data stored in the second data structure. The server compares the first and the second unique identifiers, and if the identifiers are identical, the requested data is replaced by the changed data. If the identifiers are not identical, the changed data is discarded.

20 Claims, 6 Drawing Sheets

UNIFIED AND EXTENSIBLE IMPLEMENTATION OF A CHANGE STATE ID FOR UPDATE SERVICES BASED ON A HASH CALCULATION

BACKGROUND

In a distributed application or service architecture, application data is commonly maintained for access by multiple users, thereby permitting multiple users to access and operate on the same set of application data. To prevent concurrent operations on the application data, some applications or services maintain an application data state with the application data in a backend system, such as a server. Application data retrieved by a read service for use by another service is always expected to be current. After the data has been operated on, the server must ascertain whether the data operation was performed on current or outdated data by a calling application. One way a server may preserve data in its current state is to employ a lock on the application data stored in the server and being accessed by a user, thereby preventing concurrent changes to the same set of application data. However, holding a lock on a set of application data is only permissible if an application data state is permitted to persist with the stored application data in the backend system. Web services, however, generally are stateless, such that a web service call does not leave any trace in the backend system, other than any changes made to data stored in the backend system. Further, a web service application may not reside on the backend system, but rather, for example, may be offered in an applet in a browser.

Another way a server may determine whether data stored in the database is still current after being operated on is to employ a hash calculation to calculate an identifier for a certain state of the application data. However, given that application data may exist in a multitude of formats, no uniform hash calculation exists to generate an identifier for the various types of application data. Further, in the event a user customizes application data to include various industry- or customer-specific data, the hash calculation does not take into account the customized extension. As a result, any update made to data stored in a backend system which incorporates industry- or customer-specific extensions may not be reflected in the identifier.

Therefore, it would be desirable to have a method and system for determining whether current data retrieved by a web services application remains current after it has been operated on.

DETAILED DESCRIPTION

Embodiments of the present invention provide a method and system for updating data in a distributed system. A server may receive a request to read data stored in the server. A read service may populate a data structure with the requested data, and a first unique identifier may be generated by applying a hash function to the data stored in the data structure. Subsequent to the generation of the first unique identifier, the data and the first unique identifier may be transmitted to the requesting client. The server may receive from the client system the first unique identifier and changes to the requested data performed on the client system through a web service application. The server may populate a second data structure with the requested data and generate a second unique identifier by applying a hash function to the data stored in the second data structure. The server may compare the first and the second unique identifiers, and if the identifiers are identical, the requested data may be replaced or overwritten by the changed data. If the identifiers are not identical, the changed data may be discarded.

Figure 1:
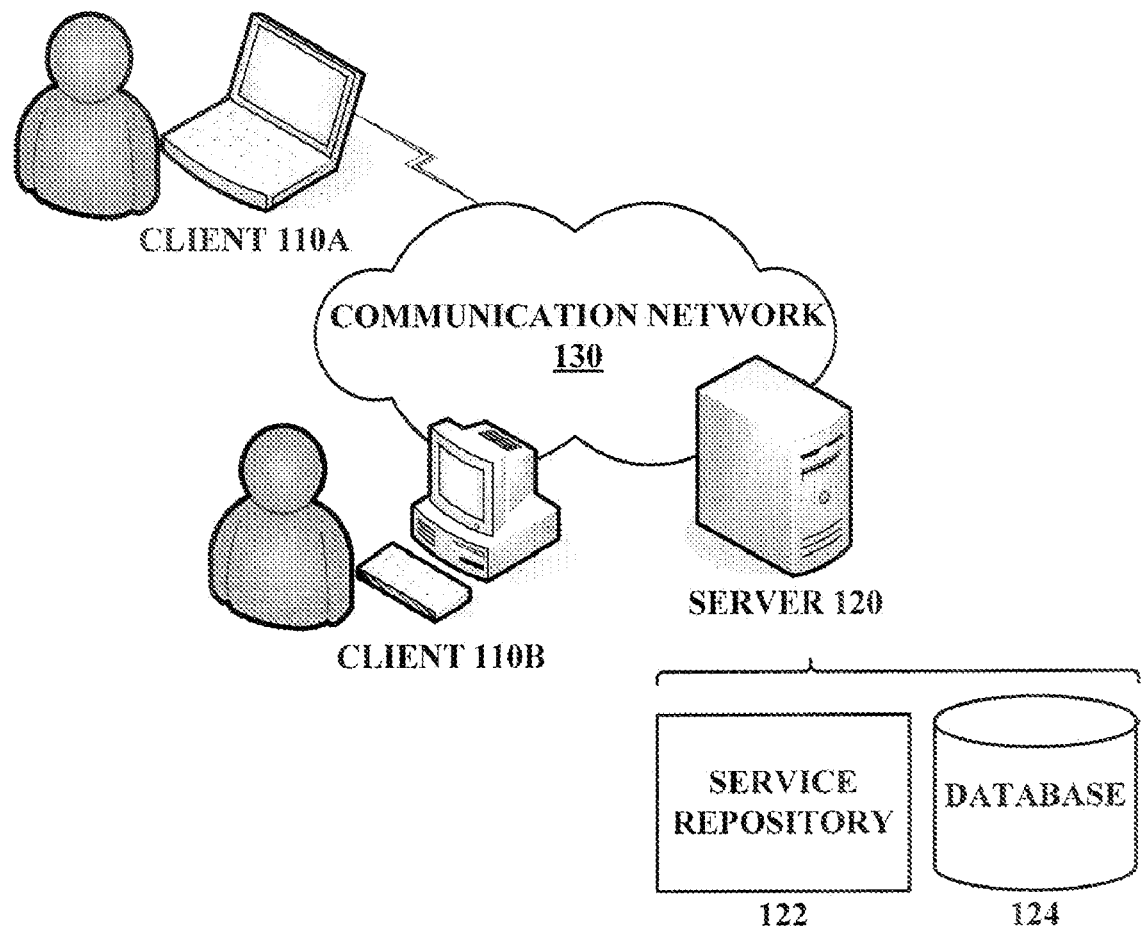
FIG. 1 is a block diagram illustrating a computer network according to an embodiment of the present invention.

FIG. 1 is a block diagram illustrating a computer system 100 according to an embodiment of the present invention. The system 100 may include various client(s) 110 and server(s) 120 interconnected by a communication network 130. The server(s) 120 may execute services or applications 122 and operate on application datasets 124. The clients 110 may communicate with the server(s) to permit operators to interact with the services or applications and access the data stored in the database 124. As shown in the example of FIG. 1, a server 120 may store application data in a database 124. The application data may be accessed and operated on by multiple clients 110A, 110B. To access the commonly stored application data, each client may invoke or call a service provided and executed by the server 120. The services 122 may manage interaction with the clients 110A, 110B supporting the operators as dictated by their programming. The services may include, but are not limited to, change service, update services, create services, and query services. The network 130 may support portal- or web interface-based communication between the clients and the server. Various network topologies and system architectures may be used advantageously with the embodiments described hereinbelow; differences among such topologies and architectures are immaterial to the present discussion unless otherwise noted.

Figure 2:
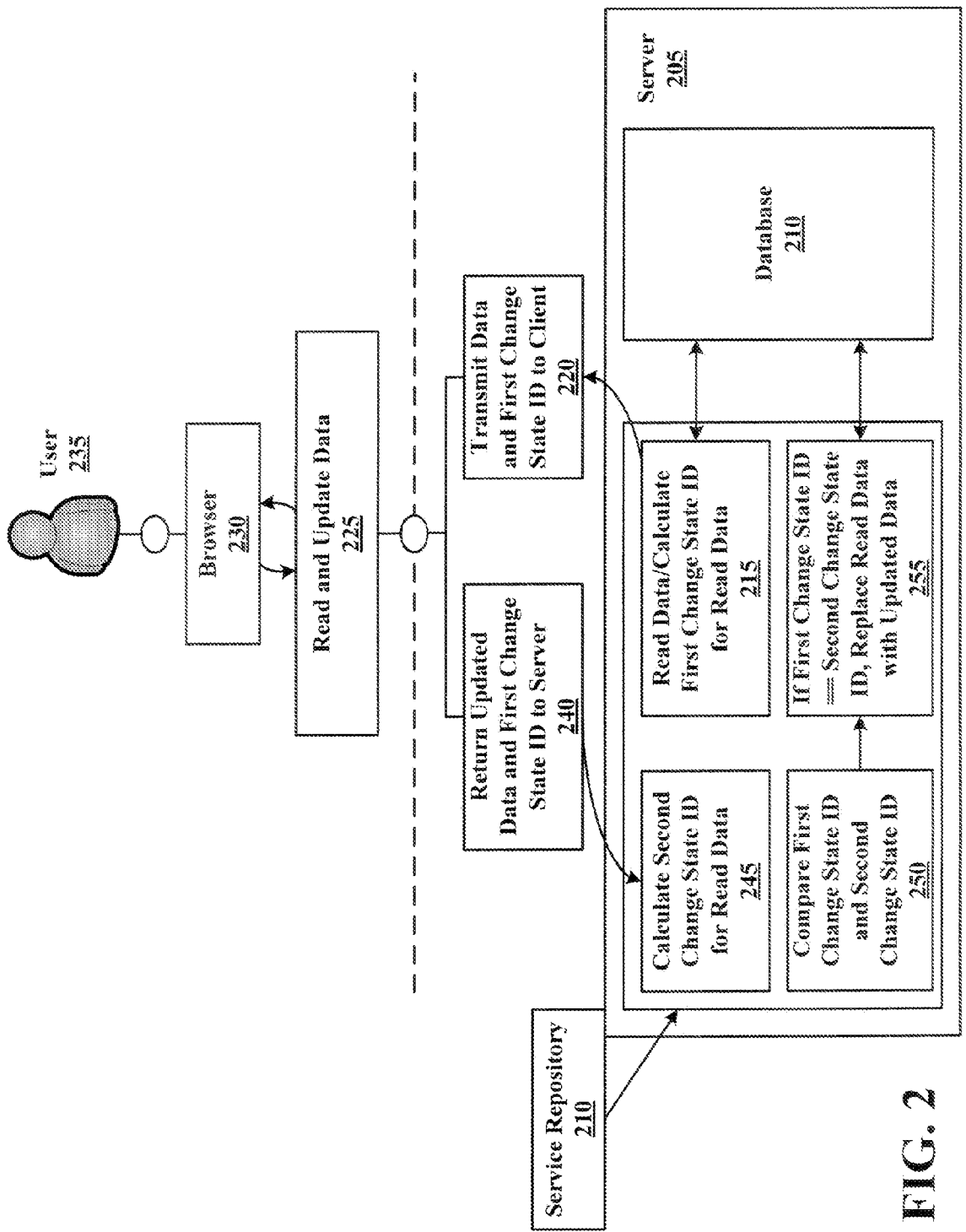
FIG. 2 is a diagram illustrating an embodiment for the updating of commonly maintained data.

FIG. 2 is a diagram illustrating an embodiment for the updating of commonly shared data. A server(s) 205, such as a database, applications, or file server, may store application data in a database 210. Application data may include business objects, application development objects, and process data. A business object may represent in the abstract a business entity or task or a business record, such as information related to an employee, a customer, a supplier, a vendor, or a business transaction. An application development object may be used in the generation of an application. The business objects and application development objects may store data in fields.

A user 235 may invoke or call a service provided by the server in a service repository 215 through a web interface or a browser 230. The service may be executed in the browser or web interface 230 as an applet or other embedded application. One such service is an update service, in which a set of data commonly stored for multiple users to access is updated or changed and sent to the server. If an update service is called, a corresponding read service may be called to retrieve the requested data from the server, as generally shown by element 215. As part of the read service, a first Change State ID may be generated, thereby aiding the server in its determination as to whether the data to be updated is current or outdated. The Change State ID in one embodiment may be a hash value calculated from the data retrieved by the read service. Other embodiments of the Change State ID may include a timestamp, a counter, or a reference to a document tracking the changes made to the data. The Change State ID may be generated at run time when the read service is called or invoked, and therefore does not need to persist in the database with the stored data. After the first Change State ID is generated, the requested data retrieved from database and the first Change State ID may be transmitted to the user, as generally shown by element 220.

The update service executing in the application embedded in the browser or web interface may receive the data and the first Change State ID and permit a user to update the data. When the update is complete, the changed data and the first Change State ID may be returned to the server, as generally shown in element 240. A second Change State ID may be generated on the data stored in the database and previously requested by the user, as generally shown in element 245. The second Change State ID may take the form of a hash value or other identifier, such as a timestamp, counter, or reference to a change document. The value of the second Change State ID may indicate whether the requested data, as stored in the database, was changed by a concurrent service during the time the user was updating a copy of the data. The server may compare the first and second Change State IDs, as generally shown by element 250. If the first and second Change State IDs are identical, the updated data returned from the client system may overwrite or replace the data stored in and originally retrieved from the database by the read service. If the first and second Change State IDs are not identical, the updated data returned by the update service is discarded, as the lack of matching identifiers may indicate that a concurrent change to the data stored in the server database has occurred.

Figure 3:
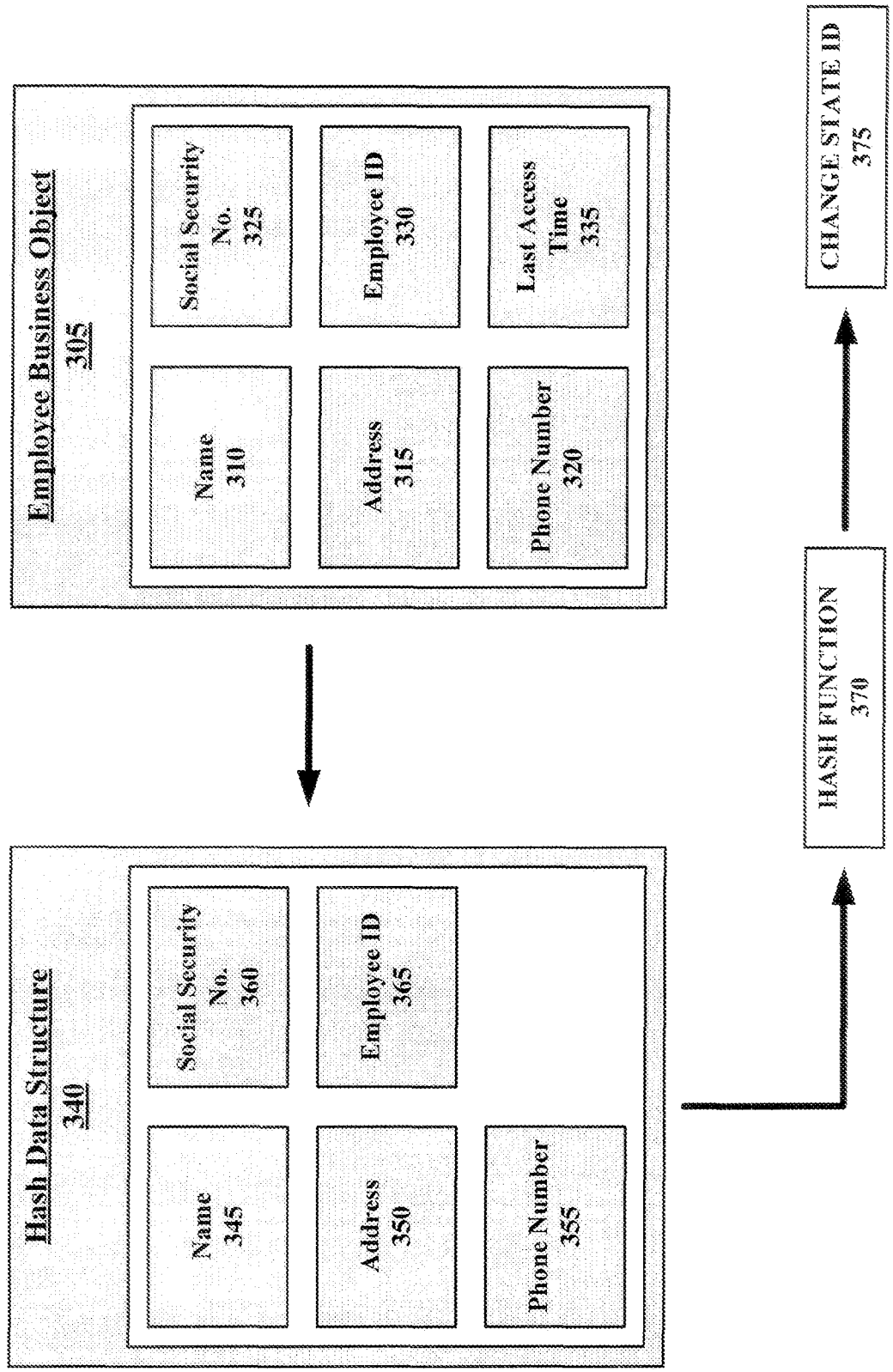
FIG. 3 is a diagram illustrating a modular view of the change state identifier generation process for an update service.

FIG. 3 is a diagram illustrating a modular view of the change state ID generation process for an update service. For the read or update services of the embodiment of FIG. 2, a Change State ID is generated to accompany the retrieved data or the updated data. The Change State ID may be a hash value calculated by applying a hash function to the retrieved or updated data. The hash value may uniquely identify the retrieved data and permit the server or backend system to determine whether the data being updated is current or outdated.

In the embodiment of FIG. 2, a server 205 may include a database 210 storing application data, such as business objects or application development objects. This application data may be commonly maintained by the server for multiple access. An example of the application data is the employee business object 305 of FIG. 3. The employee business object 305 may store data in a set of fields. These fields may include but are not limited to the employee name 310, employee address 315, employee telephone number 320, employee Social Security number 325, and employee ID 330. If the employee business object 305 is operated on by an update or read service, a method, GET_CHANGE_STATE_ID, may be called by the read or update service to determine whether a Change State ID already exists for the particular data object or set of data. If no Change State ID exists, a hash data structure 340 may be employed to calculate the Change State ID. The structure of the hash data structure may be defined by a uniform hash data structure scheme, such that each hash value calculated uses the same arrangement of data fields. The uniform hash data structure scheme eliminates the possibility that two objects having the same data ordered differently will produce two different hash values. The hash data structure 340 may contain fields deemed to be relevant to the business object, such as in the employee business object example, the employee name 345, employee address 350, employee phone number 355, etc. Other data associated with the employee business object example are not relevant and may not be included in the hash calculation. These irrelevant data elements may include but are not limited to a timestamp indicating the last time the object was accessed 335, how many times the object has been accessed, and the identity of the user who last accessed the object. A second method, FILL_HASH_DATA_STRUCTURE, may be called to fill the fields of the hash data structure with relevant data from the business object.

Once the hash data structure is filled, a third method, CALCULATE_HASH_FOR_BO_DATA, may be called to calculate a hash value 375 based on the data in the hash data structure. In one embodiment, the data in the hash data structure may not be of a single format and certain data elements may not be able to be calculated by the hash function. Certain data may be in an Advanced Business Application Programming (ABAP) format. For this embodiment, the CALCULATE_HASH_FOR_BO_DATA may transform the ABAP data into a XML string using the ABAP statement CALL TRANSFORMATION ID. Once the ABAP data has been converted into a XML string, the XML string may be concatenated with other business object data to form a single string of data. A hash value 375 may be calculated by applying a hash function to this single string of data embodying the data in the business object, as generally shown in element 370. Various hash functions may be used to calculate the hash value; the choice of a particular hash function to apply to the data is immaterial to this discussion unless otherwise noted. In one embodiment, the hash value 375 may be 40 characters long, thereby preventing any accidental reuse or overlap of hash values for two unrelated data objects or sets of data.

Figure 4:
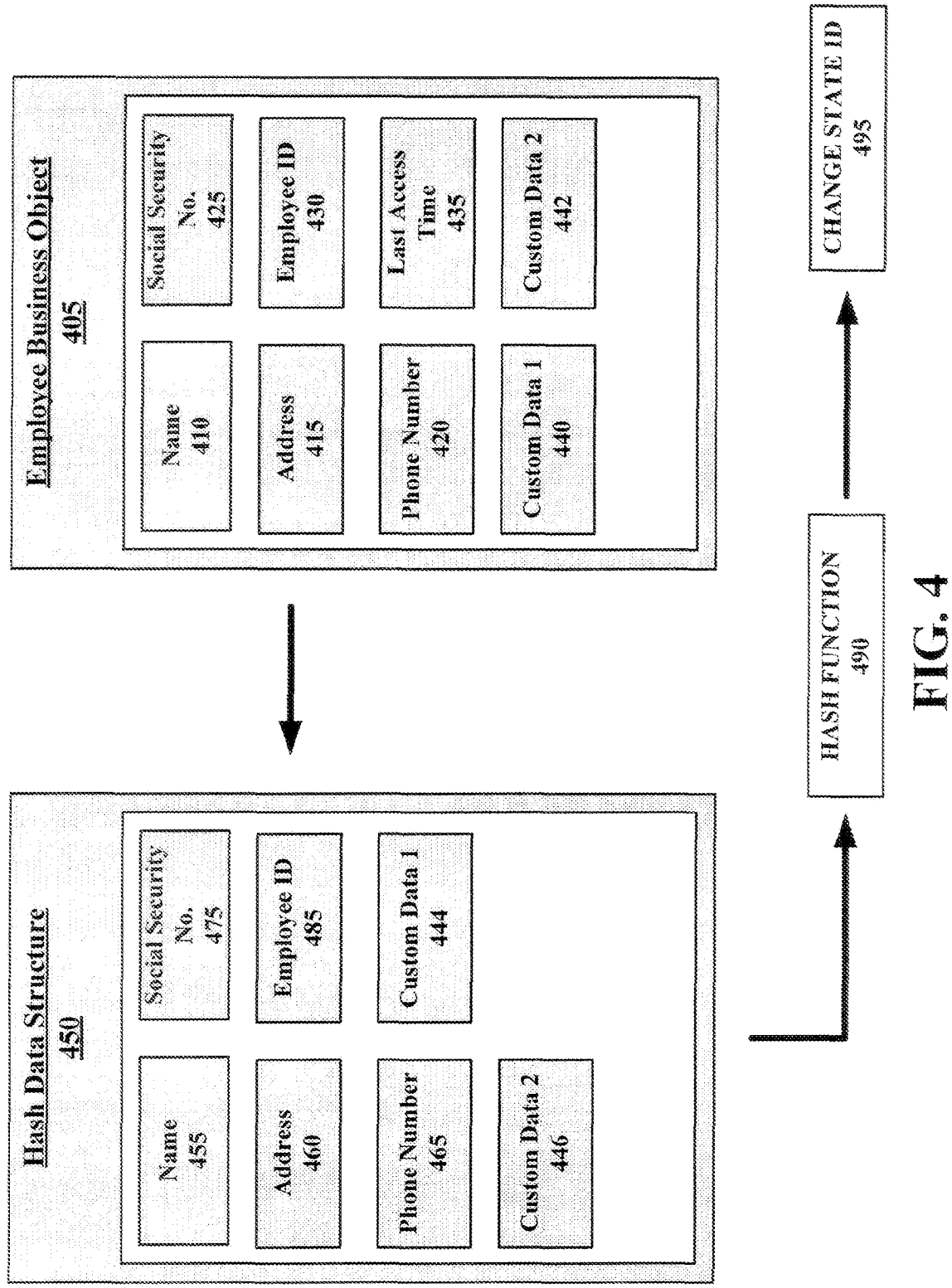
FIG. 4 is a diagram illustrating a modular view of the change state ID generation process for an update service.

FIG. 4 is a diagram illustrating a modular view of the change state ID generation process for an update service. An update service may permit a user not only to update a data object or data set, but also to extend the data object or data set to include customer-specific or customized data fields and accompanying data values. Data objects, data elements, and data structures supplied to a customer as part of a enterprise resource planning (ERP) solution may be of a standard format. It is not uncommon for customers to customize the data objects, elements, and structures to fit customer-specific needs. Thus, the data object structure itself may be extended to include additional customer-specific fields. To implement an extension to an existing object, a business add-in (BAdI) is defined by a service provider. The BAdI definition may include an interface for BAdI methods and definitions and documentation of the BAdI's semantic purpose. The calling of the BAdI methods is performed by the service provider as well. If an object is to be extended, a concrete implementation of the BAdI may be created such that the BAdI functionality is integrated into services provided by the server.

In the embodiment of FIG. 4, the employee business object of FIG. 3 has been extended to include custom data field 1 440 and custom data field 2 442, reflecting extensions in the business object. In order for a server to determine whether the extended data being operated on is current or outdated, the hash data structure 450 also may be extended so that calculated hash values reflect the extensions in the data object. The hash data structure of FIG. 3 has been extended in FIG. 4 to include custom data field 1 444 and custom data field 2 446.

To calculate the Change State ID to reflect application data extensions, the read service is called to read data from the server. The read service may call the GET_CHANGE_STATE_ID method to obtain the Change State ID for the data being read from the server. As the BAdI has been integrated with the services provided by the server, the GET_CHANGE_STATE_ID method may attempt to retrieve a hash value which includes the extended portion of the data read from the server. If a hash value is returned by the method, the method may exit and return the Change State ID returned by the business add-in. However, if no business add-in implementation exists or if the initial Change State ID value is returned, indicating that the hash value for the extended portion of the data has not been calculated, the read service may fill the extended hash data structure 450 with data from non-extended data fields of the business object using the FILL_HASH_DATA_STRUCTURE method. The business add-in also may call a corresponding FILL_HASH_DATA_STRUCTURE to fill in the extended fields of the extended hash data structure with customer-specific data. Once the extended hash data structure is filled, the method CALCULATE_HASH_FOR_BO_DATA may be called to apply a hash function to the hash data structure 450 to generate a hash value 495, as generally depicted by element 490. It is understood that the above description for generating a Change State ID, while made in the context of a read service, may equally apply to the generation of a Change State ID during an update service or other service.

Figure 5:
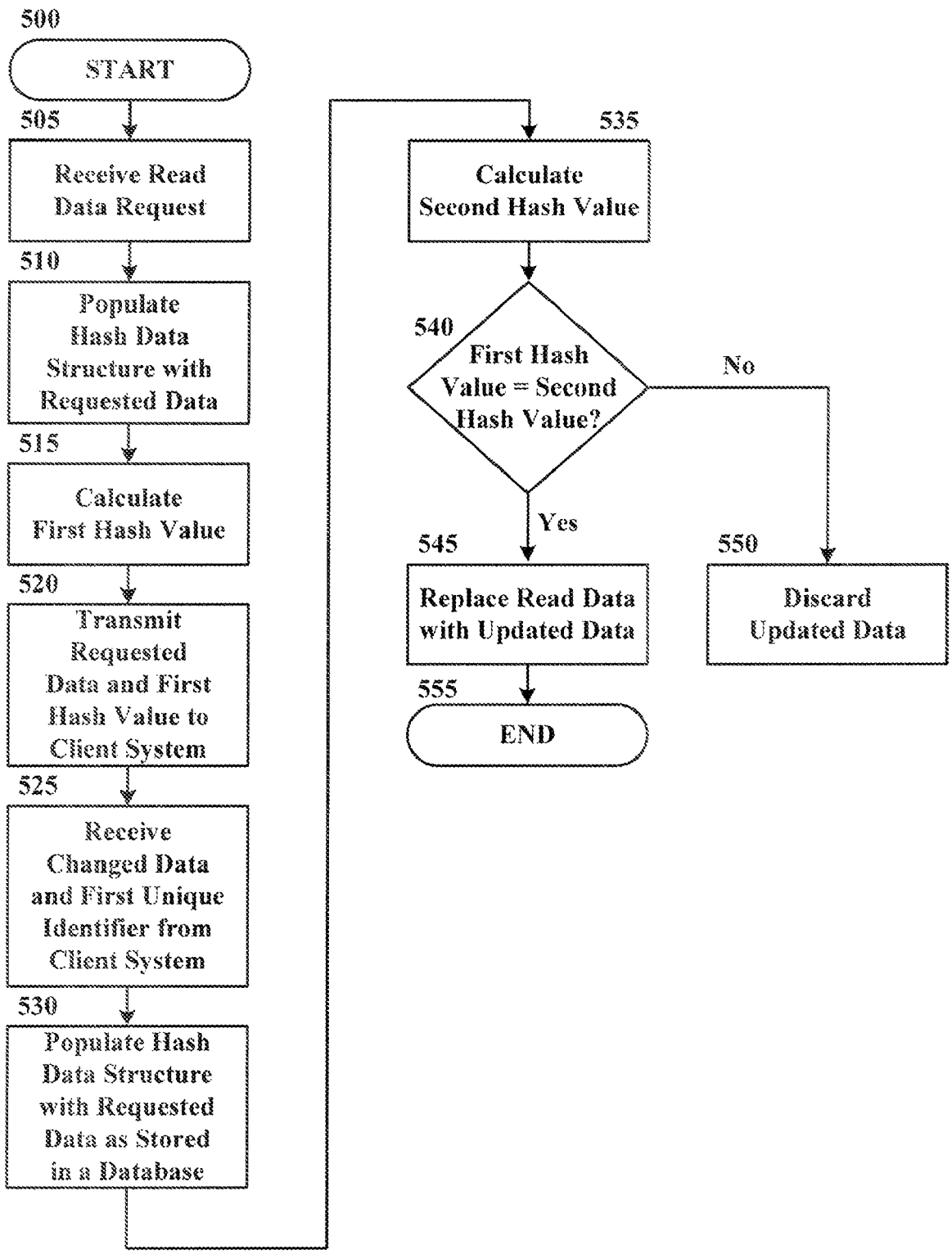
FIG. 5 is a flowchart illustrating an embodiment for updating data commonly maintained in a backend system.

FIG. 5 is a flowchart illustrating one embodiment for updating data commonly maintained in a backend system. In block 505, a server or other backend system storing application data and offering a set of services for use by clients may receive an read service request from a client to retrieve a certain data object, such as a business object, or a set of data for updating. In response to this request, the server may call a read service to retrieve the data from a database in the server. In block 510, the read service may populate a hash data structure having a set of fields corresponding to the fields of the data being read with the data from the object being read. The structure of the hash data structure may conform to a uniform hash data structure scheme. In block 515, a hash function may be applied to the data in the hash data structure to yield or generate a first hash value serving to identify the data retrieved. In one embodiment, the data elements in the hash data structure may be in string form, and the strings may be concatenated together to form one data string which is operated on by the hash function. In one embodiment, the hash value may be 40 characters. In block 520, The data retrieved by the read service and the first hash value may be transmitted to the client. The client may access the retrieved data through a web service interface or browser. The update service may be embedded in the interface or browser, for example, in one embodiment, as an applet.

In block 525, the server may receive the first hash value and changed data from the client system. The changes may occur through the update service residing in the interface or browser. In block 530, the server may populate a second hash data structure with the requested data as stored in the database. The second hash data structure may conform to the uniform hash data structure scheme, such that the fields in the second hash data structure are ordered in the same manner as the hash data structure used by the read service in the server. The result of using a uniform hash data structure scheme may be that two data objects having the same data in the same fields may yield identical hash values, and thereby, may permit a server to determine whether data being updated is current or outdated. In block 535, a hash function may be applied to the requested data as stored in the database populated in the hash data structure to generate a second hash value. In decision block 540, the server may compare the first hash value and the second hash value. If the first and second hash values are identical, in block 545, the server may permit the update service to overwrite or replace the originally retrieved data as stored in the database with the updated data. The fact that the first and second hash values are identical may indicate that the data being updated by the client system is still current data, as no changes have occurred to the copy of the data stored in the database. If the first and second hash values are not identical, in block 550, the server may deny the update service from overwriting or replacing the originally retrieved data with the updated data, as the mismatching hash values may indicate that the data stored in the system has been changed since the data was originally read.

Figure 6:
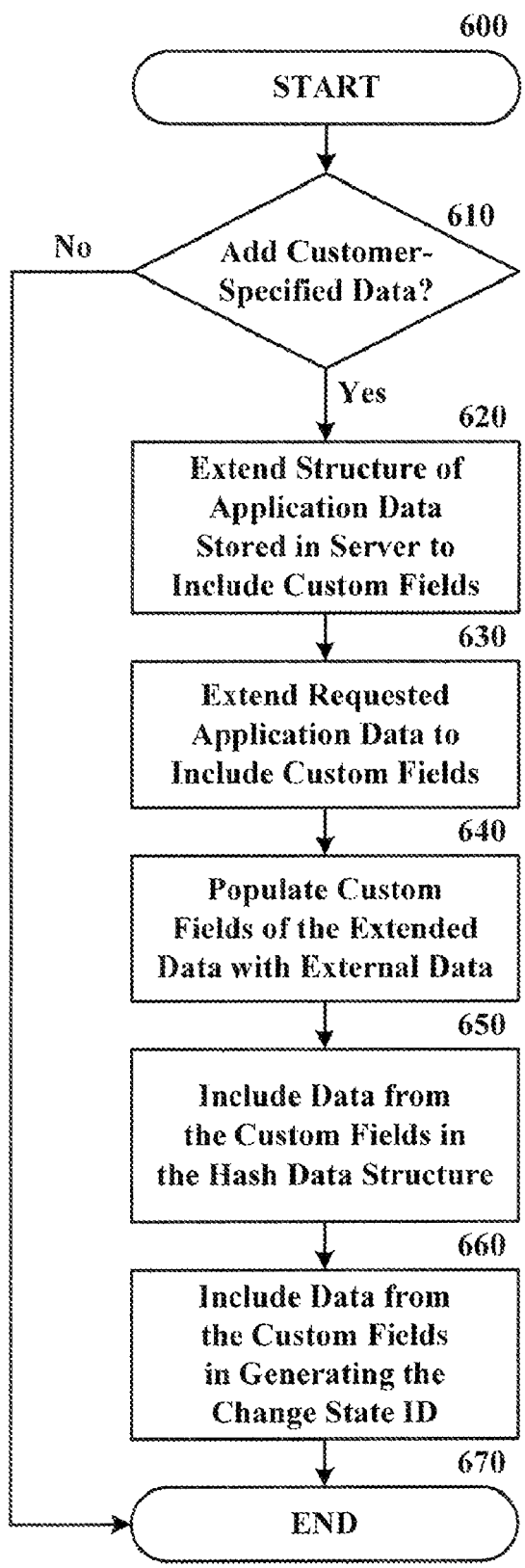
FIG. 6 is a flowchart illustrating an embodiment for extending commonly maintained data to include customized data.

FIG. 6 is a flowchart illustrating an embodiment for extending commonly maintained data to include customized data. In decision block 610, a user may determine whether to extend existing data objects to include customized data fields. If the user does not desire to extend the existing data objects, the process ends in block 670. If the existing data object or set of data is to be extended, in block 620, a software tool may extend the structure of an existing stored data object or data set. For a data dictionary or object repository storing objects, object elements, and object structures for reuse by multiple applications, the software tool may be a SAP DDIC Appends tool or a SAP Customer Includes tool. The extension may add additional fields to the existing structure of the data object. The hash data structure also may be extended to include the customized fields. In block 630, the retrieved data itself may be extended to include the added customized fields. In block 640, the custom fields of the requested data object may be filled by the user with customer-specific external data. In block 650, through the use of the business add-in, data in the custom fields may be included in the hash data structure. In one embodiment, a method, FILL_HASH_DATA_STRUCTURE, called by the business add-in may fill the extended hash data structure with external data from the customized data fields. In block 660, a Change State ID in the form of a hash value may be generated. This Change State ID may embody both the stored or updated data and the customized data. In one embodiment, a second method, CALCULATE_HASH_FOR_BO_DATA may be called by either the read or update service to generate the Change State ID.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A method of updating business object data in a distributed system, the method comprising:
 transforming unhashed data in a group of data to an XML string at a server;
 applying a hash function to the group of data in a predetermined order to calculate a first hash value with the transformed XML strings substituting for the unhashed data in the group of data;
 repeating the application of the hash function to calculate a second hash value after updating data in the group; and
 storing the updated data in the distributed system when the first hash value equals the second hash value.

2. The method of claim 1, wherein the predetermined order is specified in a uniform data structure scheme.

3. The method of claim 2, further comprising:
 adding an additional field to the business object at the server; and
 appending the additional field to the predetermined order when the additional field is also designated as part of the group of data.

4. The method of claim 1, wherein data in the group of data is initially retrieved from the distributed system prior to updating.

5. The method of claim 1, wherein data in the group of data are concatenated to form a single string of data arranged in the predetermined order.

6. The method of claim 5, wherein the unhased data includes unhashable data in an Advanced Business Application Programming language.

7. The method of claim 1, wherein the first and the second hash values are 40 bit values.

8. A computer-readable storage medium containing a set of instructions, the set of instructions capable of causing a computer to implement a method comprising:
   transforming unhashed data in a group of data to an XML string at a server;
   applying a hash function to the arranged data in the predetermined order to calculate a first hash value with the transformed XML strings substituting for the unhashed data in the arranged data;
   repeating the application of the hash function to calculate a second hash value after updating data in the group; and
   storing the updated data in the distributed system when the first hash value equals the second hash value.

9. The computer-readable storage medium of claim 8, wherein the predetermined order is specified in a uniform data structure scheme.

10. The computer-readable storage medium of claim 9, wherein the method further includes:
    adding an additional field to the business object at the server; and
    appending the additional field to the predetermined order when the additional field is also designated as part of the group of data.

11. The computer-readable storage medium of claim 8, wherein the data is initially retrieved from the distributed system prior to updating.

12. The computer-readable storage medium of claim 8, wherein data in the group of data are concatenated to form a single string of data arranged in the predetermined order.

13. The computer-readable storage medium of claim 12, wherein the unhased data includes unhashable data in an Advanced Business Application Programming language.

14. The computer-readable storage medium of claim 8, wherein the first and the second hash values are 40 bit values.

15. A distributed architecture system, comprising:
    a server comprising a processing unit, a memory unit, a database module storing application data, and a service repository storing a plurality of services, wherein the server processing unit executes a service from the plurality of services to:
       transform unhashed data in a group of data to a XML string at a server;
       apply a hash function to the group of data in a predetermined order to calculate a first hash value with the transformed XML strings substituting for the unhashed data in the arranged data;
       repeat the application of the hash function to calculate a second hash value after updating data in the group; and
       store the updated data in the distributed system when the first hash value equals the second hash value.

16. The distributed architecture system of claim 15, wherein the predetermined order is specified in a uniform data structure scheme.

17. The distributed architecture system of claim 16, wherein the server processing unit executes additional services from the plurality of services to:
    add an additional field to the group of data at the server; and
    append the additional field to the predetermined order when the additional field is also designated as part of the group of data.

18. The distributed architecture system of claim 15, wherein data in the group of data is initially retrieved from the distributed system prior to updating.

19. The distributed architecture system of claim 15, wherein data in the group of data are concatenated to form a single string of data arranged in the predetermined order.

20. The distributed architecture system of claim 15, wherein the unhased data includes unhashable data in an Advanced Business Application Programming language.

* * * * *